United States Patent Office 3,629,213
Patented Dec. 21, 1971

3,629,213
METHOD OF PREPARING CONJUGATED DIENE POLYMERS BY USING ORGANOLITHIUM BARIUM-CONTAINING COMPOUND CATALYST SYSTEM
Akira Onishi, Ryota Fujio, Minoru Kojima, and Hiroshi Kawamoto, Tokyo, Japan, assignors to Bridgestone Tire Company Limited, Tokyo, Japan
No Drawing. Filed June 3, 1969, Ser. No. 830,136
Claims priority, application Japan, June 8, 1968, 43/38,979; Aug. 21, 1968, 43/59,220
Int. Cl. C08d 3/08
U.S. Cl. 260—82.1  24 Claims

ABSTRACT OF THE DISCLOSURE

Conjugated dene polymers having a desirable microstructure for a rubbery elastomer is produced by contacting at least one conjugated diene or a mixture of a conjugated diene with a vinyl-substituted aromatic hydrocarbon with a catalyst consisting of an organolithium compound and a barium compound. In the polymers of at least one conjugated diene, the polymers having a low content of 1,2- or 3,4-structure and a high trans-1,4-structure in conjugated diene unit can be obtained by adjusting the ratio of the catalyst components and in the copolymers of a conjugated diene and a vinyl-substituted aromatic hydrocarbon, the copolymers having a microstructure of a low vinyl content and a high randomness can be formed.

---

The present invention relates to a method of producing conjugated diene polymers by means of a novel catalyst system, more particularly a method of producing conjugated diene polymers containing a characteristic microstructure highly effectively by contacting at least one conjugated diene or a mixture of a conjugated diene with a vinyl-substituted aromatic hydrocarbon with a catalyst consisting of an organolithium compound and a barium compound.

The term "conjugated diene polymers" used herein means homopolymers of a conjugated diene, copolymers of two or more different conjugated dienes and copolymers of a conjugated diene and a vinyl-substituted aromatic hydrocarbon.

It has been well-known that when a mixture of a conjugated diene and a vinyl-substituted aromatic hydrocarbon, such as styrene, is copolymerized in a hydrocarbon solvent by means of an organolithium compound, there is a large difference in reactivity between both the monomers and as the polymerization proceeds, firstly a more reactive monomer of a conjugated diene is mainly consumed and then a less reactive monomer of a vinyl-substitued aromatic hydrocarbon is mainly polymerized, whereby a block copolymer consisting of a poly(conjugated diene) block and a poly(vinyl-substituted aromatic hydrocarbon) block is formed. However, it has been known that the block copolymer of a conjugated diene and a vinyl-substituted aromatic hydrocarbon is used for a particular application due to physical properties resulting from the configuration but such a copolymer is not suitable as ordinarily used polymers, for example, for production of tire and for these uses a random copolymer is desirable. Furthermore, in order to vary a processability and a cross-linking velocity of a homopolymer of a conjugated diene and a copolymer of two or more different conjugated dienes, it has been attempted to increase a ratio of 1,2- or 3,4-structure within the molecular weight showing a rubbery state.

In order to obtain such a polymer, a large number of attempts have been heretofore made in the homopolymerization and copolymerization using an organo-lithium compound as a catalyst. As the preferable process, a means, wherein the homopolymerization reactivity of a conjugated diene or the copolymerization reactivity of two or more different conjugated dienes or a conjugated diene and a vinyl-substituted aromatic hydrocarbon are varied by using various randomizing agents, has been known.

Namely, the processes have been proposed, wherein as the randomizing agent, (1) ether, thioether or a tertiary amine, (2) hexamethyl-phosphorotriamide, (3) a difunctional Lewis base, such as tetramethylethylene diamine or (4) an organic compound of potassium, sodium, etc., such as potassium-tert-butoxide is used.

The present invention relates to a method or producing conjugated diene polymers having characteristics microstructure very effectively and is to provide a method of producing easily conjugated diene polymers having a desirable microstructure as a rubbery elastomer.

The method of producing the conjugated diene polymers comprises contacting a monomeric material selected from (1) at least one conjugated diene and (2) a mixture of a conjugated diene and a vinyl-substituted aromatic hydrocarbon, at a temperature in the range of −30 to 150° C., in the presence of a hydrocarbon diluent, with a catalyst consisting of (I) an organolithium compound having the formula $R^1(Li)_x$, wherein $R^1$ is selected from the group consisting of aliphatic, cycloaliphatic and aromatic hydrocarbon radicals having 1 to 40 carbon atoms and $x$ is an integer from 1 to 4 and (II) barium compound having one of the following formulae:

(1)

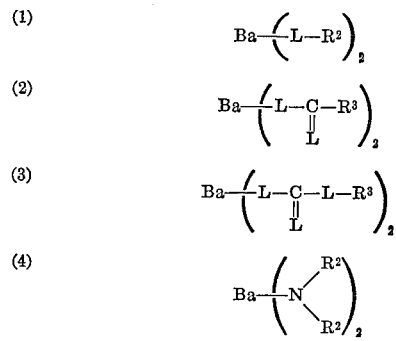

(2)

(3)

(4)

(5) diphenyl barium
(6) barium benzophenoneketyl
(7) biscyclopentadienylbarium
(8) 1,2-acenaphthylenebarium (9)

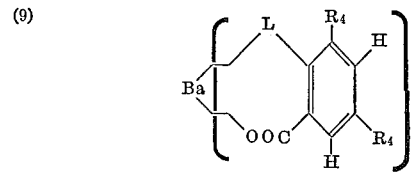

wherein $R^2$ is selected from the group consisting of aliphatic, cycloaliphatic and aromatic hydrocarbon radicals having 1 to 20 carbon atoms, $R^3$ is selected from the group consisting of aliphatic, cycloaliphatic and aromatic hydrocarbon radicals having 4 to 20 carbon atoms, $R^4$ is selected from the group consisting of hydrogen and aliphatic hydrocarbon radical having 1 to 10 carbon atoms, L is oxygen or sulfur; the amount of said organolithium compound being in the range of 0.01 to 100 mmoles per mole of said monomeric material, the amount of said barium compound being in the range of 0.01 to 100 mmoles per mole of said monomeric material and the molar ratio of said barium compound to said organolithium compound being in the range of 0.05 to 10.0.

An explanation will be made with respect to the characteristics and effects of the two component catalyst of an organolithium compound and barium compound.

(1) Homopolymer of a conjugated diene or copolymer of two or more different conjugated dienes: Even if the molar ratio of the barium compound to the organolithium compound (Ba/Li) and the condition for aging the catalyst are varied, the content of 1,2- or 3,4-structure in conjugated diene is substantially constant within the range of 8% to 13%, but the content of trans-1,4-structure varies successively from 50% to 70% by increasing the ratio of Ba/Li or varying the condition for aging the catalyst.

(2) Copolymerization of a conjugated diene and a vinyl-substituted aromatic hydrocarbon: If the Ba/Li ratio or the condition for aging the catalyst are varied as described above, the microstructure of conjugated diene shows the same variation as in the above case (1) and further the conjugated diene and the vinyl-substituted aromatic hydrocarbon (particularly styrene) are copolymerized randomly. Furthermore, even in a low Ba/Li ratio, they are sufficiently copolymerized randomly.

Accordingly, a random copolymer having such a low content of 1,2-structure that 1,2- or 3,4-structure is 8 to 13% and trans-1,4 structure is 50 to 70% in the microstructure of conjugated diene unit, is generally produced. On the other hand, as to the microstructure of conjugated diene unit of conjugated diene polymers obtained by the above described four randomizing agents, having a relation to the present invention, when no or a small amount of a randomizing agent is used, the contents of trans-1,4, cis-1,4 and 1,2- or 3,4-structure are 50 to 55%, 40 to 35% and about 10% respectively but as an amount of randomizing agent used increases, the content of 1,2- or 3,4-structure increases gradually and the content of trans-1,4 decreases proportionally and finally 1,2- or 3,4-structure reaches more than 60%. In the production of conjugated diene polymers by using the organolithium compound, any previously known randomizing agents have no function that does not vary the content of 1,2- or 3,4-structure and increases trans-1,4-structure and it has been found that barium compounds of this invention have such a function. If a copolymer of 1,3-butadiene and styrene (SBR) is referred to as an embodiment, SBR obtained by a two component catalyst of this invention has a higher tensile strength than the other commercially available SBR obtained by a solution polymerization and it is believed that this is due to the specific structure of the polymer SBR according to the present invention, that is higher in the content of trans-1,4 structure and lower in the content of 1,2-structure than any commercially available SBR obtained by a solution polymerization and it has been known that if the content of 1,2-structure is low, the glass transition temperature lowers. The low glass transition temperature improves the physical properties of an elastomer together with random distribution of styrene unit in the copolymer chain.

The monomeric material to be used in the present invention is selected from the group consisting of (1) at least one conjugated diene and (2) a mixture of a conjugated diene and a vinyl-substituted aromatic hydrocarbon.

The preferable conjugated diene contains 4 to 12 carbon atoms per molecule and includes, for example, 1,3-butadiene, isoprene, 1,3-pentadiene, 2,3-dimethyl-1,3-butadiene, 2-methyl-1,3-pentadiene, 2-phenyl-1,3-butadiene and 1-phenyl-1,3-butadiene. Among them, 1,3-butadiene and isoprene are preferable.

The vinyl-substituted aromatic hydrocarbon is a compound having 8 to 20 carbon atoms per molecule, wherein at least one vinyl group is attached to carbon atoms of aromatic nuclear, and includes styrene, 1-vinylnaphthalene, 3-vinyltoluene, divinylbenzene and the like. Among them, styrene is preferable. As the other vinyl-substituted aromatic hydrocarbons, mention may be made of 3,5-diethylstyrene, 4-n-propylstyrene, 2,4,6-trimethylstyrene, 4-phenylstyrene, 4-p-tolylstyrene, 3,5-diphenylstyrene, 3-ethyl-1-vinylnaphthalene, 8-phenyl-1-vinylnaphthalene, etc.

The organolithium compounds to be used in the formation of the catalyst according to the present invention have the following general formula $$R^1(Li)x$$

wherein $x$ is an integer from 1 to 4 and $R^1$ represents an aliphatic, alicyclic or aromatic hydrocarbon radicals. The number of carbon atoms of $R^1$ is not particularly limited and $R^1$ includes high molecular weight residues. The organolithium compounds having the above formula, wherein $x$ is 1 and $R^1$ is hydrocarbon radical having 1 to 20 carbon atoms, are preferable. Suitable $R^1$ group involve alkyl, alkenyl, cycloalkyl, aryl, alkaryl, aralkyl and the like. As the above described organo-lithium componds, mention may be made of methyllithium, ethyllithium, n-propylllithium, isopropyllithium, n-butyllithium, isobutyllithium, sec-butyllithium, tert-butyllithium, n-amyllithium, isoamyllithium, n-hexyllithium, 2-ethylhexyllithium, n-octyllithium, n-decyllithium, stearyllithium, allyllithium, n-propenyllithium, isobutenyllithium, 1-cyclohexenyllithium, cyclopentyllithium, cyclohexyllithium, cyclohexylethyllithium, phenyllithium, naphthyllithium, tolyllithium, butylphenyllithium, benzyllithium, phenylbutyllithium, etc. The organo-lithium compounds having the above formula, wherein $R^1$ has 2 to 40 carbon atoms and $x$ is 2 to 4, are also included within the scope of the invention. They are, for example, tetramethylenedilithium, pentamethylenedilithium, hexamethylenedilithium, diphenylethylenedilithium, tetraphenylethylenedilithium, 1,5-dilithium naphthalene, 1,20-dilithioeicosane, 1,4-dilithiocyclohexane, dilithiostylbene and the like. The organolithium compounds containing an inert functional group to polymerization can also be used. Furthermore, the organic mono- or di-lithium compounds, wherein $R'$ contains more than 40 carbon atoms, are included within the scope of the invention, and among them the organolithium compounds, in which lithium is attached to one or both terminal groups of a linear polymer are preferable. Particularly, the preferable compounds include polystyrylmonolithium, polyisoprenylmonolithium, polystyryldilithium, polybutadienyldilithium, polyisoprenyldilithium, linear copolymers of styrene and butadiene, in which lithium is attached to one or both terminal groups, and the like. A mixture of two or more of the above described organolithium compounds may also be used. Among the organolithium compounds, alkyllithiums in which alkyl group contains 2 to 8 carbon atoms are preferable and n-butyllithium is most preferable.

The barium compounds to be used in the catalyst according to the present invention are selected from the compounds having the following formulae:

(1)
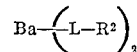

(2)
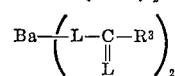

(3)
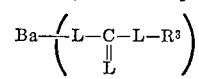

(4)
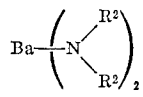

(5) diphenylbarium,
(6) barium benzophenoneketyl,
(7) biscyclopentadienylbarium,
(8) 1,2-acenapthtenylenebarium, (9)

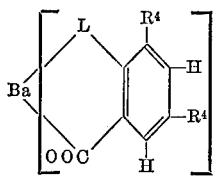

wherein $R^2$ is an aliphatic, alicyclic or aromatic hydrocarbon radicals, preferably having 1 to 20 carbon atoms, $R^3$ is an aliphatic, alicyclic or aromatic hydrocarbon radical, preferably having 4 to 20 carbon atoms, $R^4$ is a hydrogen atom or a saturated aliphatic hydrocarbon radical, preferably having 1 to 10 carbon atoms and L is an oxygen or sulfur atom.

Examples of the barium compound corresponding to the above Formula 1 include barium alkoxides and barium thioalkoxides of methyl alcohol, ethyl alcohol, n-propyl alcohol, isopropyl alcohol, tert-butyl alcohol, tert-amyl alcohol, n-hexyl alcohol, cyclohexyl alcohol, eicosyl alcohol, allyl alcohol, 2-butenyl alcohol, 3-hexenyl alcohol, 2,5-decadienyl alcohol, 3-cycopentenyl alcohol, 4,6-di-n-butyl decyl alcohol, 4,8-dodecadienyl alcohol, benzyl alcohol, 3-(4-tolylpropyl) alcohol, phenol, catechol, resorcinol, hydroquinone, 1-naphthol, 2-naphthol, 2,6-di-tert-butyl phenol, 2,6-di-tert-butyl-4-methyl phenol (Ionol), 2,4,6-tri-tert-butyl phenol, 2,6-di-tert-butyl-4-phenyl phenol, 2,6-di-sec-butyl-4-methyl phenol, ethanethiol, 1-butanethiol, 2-pentanethiol, 2-isobutanethiol, benzenethiol (thiophenol), tert-dodecanethiol, 2-naphthalenethiol, cyclohexanethiol, 3-methylcyclohexanethiol, benzene methanethiol, 2-naphthalene methanethiol and the like.

As the barium compounds of the carboxylic acids and the sulfur homologs as shown in the above Formula 2, mention may be made of barium salts of isovaleric acid, caprylic acid, octanoic acid, lauric acid, myristic acid, palmitic acid, stearic acid, arachic acid, oleic acid, ricinoleic acid, linolic acid, gadoleic acid, cyclopentane carboxylic acid, naphthenic acid, phenylacetic acid, benzoic acid, 2-naphthoic acid, hexanethiolic acid, 2-2-dimethylbutanethiolic acid, decanethionic acid, tridecanethiolic acid, 4-tetradecanethionic acid, thiobenzoic acid and the like.

Examples of barium salts of acidic carbonates and the sulfur homologs as shown in the above Formula 3 involve barium salts of tert-butyl acidic carbonate, 3,5-dimethylhexyl acidic carbonate, n-hexyl acidic carbonate, n-dodecyl acidic carbonate, diethylhexyl acidic carbonate, phenyl acidic carbonate, tert-butyl thioacidic carbonate and the sulfur homologs.

The barium salts of secondary amine as shown in the above Formula 4 include, for example, barium salts of dimethylamine, diethylamine, di-n-butylamine and the like.

The barium salts of salicylic acid or 3,5-dialkylsalicylic acid and the sulfur homologs as shown in the above Formula 9 include, for example, barium salts of 3,5-diisopropylsalicylic acid, 3,5-diisopropylthiosalicylic acid and the like.

In the production of the catalyst, of course, at least one of the barium compounds as shown in the above formulae can be used together with at least one of $R^1(Li)x$ compounds. As to an amount of organolithium compound, which is one component of the catalyst of this invention, it has been well-known that when such a compound is used alone, the polymerization velocity is increased and the molecular weight is decreased by increasing the amount and this characteristic is not lost in the catalyst of this invention, in which a barium compound is added. Accordingly, the amount can vary within a broad range depending upon the object or the method of polymerization and in general, the amount ranges from 0.01 mmole to 100 mmoles per mole of the monomeric material, but when it is intended to produce a high molecular weight copolymer in a high activity, a range of 0.03 to 10 mmoles per mole of the monomeric material is used.

The catalyst is prepared by mixing at least one organolithium compound and at least one barium compound. The barium compound to be used for formation of an effective catalyst is usually 0.01 to 100 mmoles per mole of the monomeric material, preferably 0.05 to 50 mmoles and the molar ratio of the barium compound to the organolithium compound is not particularly limited, but the molar ratio suitable for well maintaining the activity of organolithium compound is 0.05 to 10.0, preferably, 0.1 to 4.0. It is possible to vary trans-1,4 content in conjugated diene unit and the randomness of the copolymer while maintaining the activity well by varying the molar ratio.

It is necessary that the reaction solvent to be used in the preparation of the catalyst (B) contains an aromatic hydrocarbon and generally an aromatic hydrocarbon itself is used. However, a mixture of an aromatic hydrocarbon with an aliphatic hydrocarbon or an alicyclic hydrocarbon may also be used, but it is necessary that an aromatic hydrocarbon is contained in an amount of at least 1% by weight, preferably at least 5% by weight. Even if potassium, rubidium and/or cesium are added to a solution of the organolithium compound in an aliphatic or alicyclic hydrocarbon solvent and the resulting mixture is heated and stirred, the metals do not substantially react nor dissolve and it is impossible to prepare a catalyst. The preferable aromatic hydrocarbons are ones having 6 to 20 carbon atoms, for example, benzene, toluene, ethylbenzene, cumene, xylenes, tetrahydronaphthalene, durene, etc. Furthermore, as aliphatic or alicyclic hydrocarbons to be used for mixing with the aromatic hydrocarbon, mention may be made of pentane, hexane, heptane, octane, decane, cyclopentane, cyclohexane and the like.

The reaction process to be applied to preparation of the catalyst (B) is as follows:

Potassium, rubidium or cesium is added to a solution of the organolithium compound in a hydrocarbon containing an aromatic hydrocarbon and the resulting mixture is heated to near melting point of the metal and then is stirred thoroughly to convert the metal into fine granule and further heated and stirred be effected by a bulk polymerization process, but in general a solution or suspension polymerization process in an inert diluent is preferable. It is desirable that the solvent is liquid under usual condition of polymerization reaction and hydrocarbons having less than 20 carbon atoms, particularly, aliphatic, alicyclic, aromatic hydrocarbons, such as, propane, butane, pentane, heptane, octane, isooctane, cyclopentane, cyclohexane, decane, hexadecane, benzene, toluene, ethylbenzene, xylenes, tetrahydronaphthalene, etc., are used. Of course, it is included in a scope of the present invention to use these solvents in a mixture of at least two. An amount of the solvent used is determined by the desired molecular weight of polymer or the kind of solvent and the like, but usually such an amount is within the range of 100 to 2,000 parts by weight, preferably, 300 to 1,000 parts by weight based on 100 parts by weight of the monomeric material. Furthermore, if necessary, it is possible to maintain the reaction system at a proper viscosity by adding a solvent during the polymerization reaction.

The method of the present invention can be carried out in a batch system or a continuous system by using a proper process for adding the starting materials. The catalyst, solvent and monomer can be added simultaneously to a reaction vessel or the solvent, monomer and catalyst may be added in turn in the thus described order. Furthermore, it is possible to effect the polymerization continuously by maintaining the concentration of the reactant in the reaction vessel properly during a proper residence time. The polymerization temperature in a batch system is not particularly limited, but the polymerization is substantially completed within 24 hours even by a very small amount of catalyst. In a continuous process, the residence time varies broadly depending upon the condition, but the time is from several minutes to about two hours under the condition of a defined range.

According to the present invention the polymerization can be carried out at a temperature within a range of −30 150° C., but usually it is preferable to effect the polymerization within a range of 0 to 100° C., more preferably 40 to 80° C. Furthermore, it is included within the scope of the present invention that in a batch system the temperature raises continuously or in a multi-stage or that in a continuous system, the temperature raises at the end of polymerization. The polymerization reaction can be effected under a pressure generated autogenously, but it is preferable to effect the polymerization under a sufficient pressure to maintain the monomer in a liquid state. In general, the pressure depends upon the monomer to be polymerized, solvent and polymerization temperature.

After the polymerization is completed or a desired molecular weight is attained, the polymer can be recovered by a normal after-treatment. For example, it is possible to effect a normal antioxidation, inactivation of catalyst, separation and recovery of polymer, drying and the like to obtain the polymer. Namely, the polymerization solution may be added with an antioxidant and then added with a non-solvet, such as, methyl alcohol, isopropyl alcohol, water and the like to deactivate the catalyst to recover the polymer. Alternatively, the polymerization solution may be added with an antioxidant and then the resulting mixture is poured into a heated non-solvent, such as hot water and then the solvent or in some case, a mixture of the solvent and unreacted monomer is distilled off to separate the polymer. Furthermore, the catalyst is sufficient in a very small amount and therefore even if the catalyst remains in the polymer, in many cases, the physical properties are never deteriorated, but when it is required to decrease the remained catalyst to a low level, such an object can be easily attained by contacting the reaction solution with a large amount of proper non-solvent effectively. Of course, it is possible to adopt a reprecipitation process for purification of the polymer.

The method of the present invention particularly relates to production of a rubbery homopolymer of a conjugated diene or rubbery copolymers of two or more different conjugated dienes or a conjugated diene and a vinyl-substituted aromatic hydrocarbon and can be utilized particularly, for production of random copolymer containing no polymeric block of vinyl-substituted aromatic hydrocarbon. The content of 1,2- or 3,4-structure in the random copolymer of a conjugated diene and a vinyl-substituted aromatic hydrocarbon can be decreased to about 10%.

An amount of a conjugated diene to be used for production of the conjugated diene polymers can be varied within a broad range, such as, 100 to 5 parts by weight of conjugated diene based on 100 parts by weight of the total monomers.

The rubbery polymers obtained in a proper composition of monomers can be compounded with natural rubber and the like in a conventional means. In production of the final products, this rubbery polymer can be molded in a compression or an extrusion and they are used in the production of car tire, gasket, containers, sheet and the like.

The invention will be explained in more detail by the following examples. In the examples, "part" and "percent" mean by weight, excluding the second component of catalyst (hereinafter referred to as the second component). The amount of the second component used is shown by the molar ratio of the second component to the first component of $R^1(Li)x$. For example, the expression "the amount of the second component used is 1.0" means that the molar ratio of the second component to $R^1(Li)x$ is 1.0.

EXAMPLES 1 AND 2

A beverage bottle of 100 ml. capacity was dried completely and air in the bottle was substituted with purified nitrogen 3 times. The bottle was charged with 100 parts of dried toluene, a predetermined amount of di(tert-butoxy) barium and 0.5 part (0.5 mmole) of s-butyllithium (hereinafter abridged as n-BuLi) in this order, and then sealed. The aging was effected at 50° C. for 60 minutes. The reaction system turned yellowish brown. When the amount of di(tert-butoxy) barium was large, the reaction system showed a somewhat heterogeneous phase. Then, 100 parts of cyclohexane and 25 parts of styrene were charged into the bottle by means of an injector, and the resulting mixture was cooled to −78° C., after which 75 parts of 1,3-butadiene were fed thereto and the bottle was again sealed. The bottle was left to stand in a thermostat kept at 50° C. to effect polymerization for a predetermined period of time. Then, a large amount of 2% solution of phenyl-β-naphthylamine in ethanol was added to the reaction mixture to stop polymerization reaction. The precipitated copolymer was filtered and dried under vacuum at 50° C.

A control experiment was carried out in the exactly same manner as described in Example 1, except that di(tert-butoxy)barium of the second component was not added, which was Comparative Example 1.

The obtained result is shown in the following Table 1.

TABLE 1

| Example Number | Amount of the second component used | Polymerization time (minutes) | Yield (percent) | Intrinsic viscosity [η] | Styrene content (percent) | Microstructure of butadiene unit (percent) | | | Recovery of oxidative degradation product (percent) |
|---|---|---|---|---|---|---|---|---|---|
| | | | | | | Trans-1,4 | Vinyl | Cis-1,4 | |
| 1 | 0.1 | 180 | 70.0 | 0.73 | 17.4 | 67.9 | 12.1 | 20.0 | 0 |
| 2 | 0.5 | 90 | 40.0 | 0.74 | 21.1 | 66.3 | 11.9 | 21.8 | (¹) |
| Comparative Example 1 | 0.0 | 180 | 76.0 | 0.41 | 6.2 | 53.7 | 8.8 | 37.5 | 56 |

¹ Not measured.

In the above table, the intrinsic viscosity was determined at 30° C. with respect to a polymer solution containing 1 g. of a polymer sample per 100 cc. of toluene. The intrinsic viscosity described in the following examples was measured under the same condition.

The microstructure of 1,3-butadiene unit and styrene content in the coplymer were analysed in the following procedure by the use of infrared spectrophotometer, and the above table shows the thus obtained result.

The instensity of infrared spectrum is shown by the following Formula 1 according to Beer's law.

$$I = I_0 e^{-kct} \quad (1)$$

wherein:

I: intensity of infrared ray after passed through a sample
$I_0$: intensity of infrared ray before passing through the sample
$k$: extinction coefficient of the sample
$c$: concentration of the sample
$t$: cell thickness.

With respect to the absorption bands at 760 cm.$^{-1}$ in styrene, at 917 cm.$^{-1}$ in trans-1,4 bond of butadiene unit and at 910 cm.$^{-1}$ in vinyl bond, each extinction coefficient was calculated from a model substance by means of a 402G grating infrared spectrophotometer made by Nihon Bunko K. K. The Formula 1 is modified to obtain the following Formula 2

$$D = \log I_0/I = kct \qquad (2)$$

Therefore, the amount of trans-1,4 bond and vinyl bond and concentration of styrene can be easily calculated from the measured values of the cell thickness $t$ and the absorbance $D$ and the above-described extinction coefficient. The concentration of cis-1,4 bond is determined by subtracting the concentration of trans-1,4 bond, vinyl bond and styrene from the concentration of the sample.

The microstructure of 1,3-butadiene unit and styrene content described in the present invention are defined as follows:

cis-1, 4 content (percent by weight)

$$= \frac{Cc}{Ct + Cv + Cc} \times 100$$

trans-1, 4 content (percent by weight)

$$= \frac{Ct}{Ct + Cv + Cc} \times 100$$

vinyl content (percent by weight) $= \frac{Cv}{Ct + Cv + Cc} \times 100$ styrene content (percent by weight)

$$= \frac{Cst}{Ct + Cv + Cc + st} \times 100$$

wherein:

$Ct$: concentration of trans-1,4 bond in the copolymer determined by infrared analysis
$Cv$: concentration of vinyl bond in the copolymer determined by infrared analysis
$Cc$: concentration of cis-1,4 bond in the copolymer determined by infrared analysis
$Cst$: concentration of styrene bond in the copolymer determined by infrared analysis The measurement of infrared spectrum was effected by dissolving a copolymer sample in carbon disulfide and using a cell of the solution having a thickness of 0.5 mm.

When styrene contents of copolymers produced in various feed ratios of styrene are determined by the use of the above-described infrared analysis. The obtained styrene content agreed very well with the theoretical styrene content in the case that the conversion is assumed to be 100%.

The microstructure of polybutadiene also was analyzed quantitatively in the exactly same procedure.

Furthermore, in order to determine the random property of the copolymer obtained in the present invention, the randomness of styrene chain was calculated from the recovery of polystyrene according to the following oxidative degradation method.

This oxidative degradation was effected according to a method disclosed by I. M. Kolthoff, in which osmium tetroxide and tert-butyl peroxide are used (Journal of Polymer Science, vol. 1, page 429 (1946)). That is, when the copolymer of the present invention is oxidatively degraded by the use of osmium tetroxide catalyst and tert-butyl peroxide, only butadiene unit is degraded and styrene unit remains undecomposed. When the degraded styrene chain has a polymerization degree of less than about 5, the styrene chain is soluble in methanol, while when the degraded styrene chain has a polymerization degree of more than about 5, the styrene chain is insoluble in methanol. Thus, the randomness of the copolymer can be determined from the recovery of styrene chain insoluble in methanol.

The term "recovery of styrene chain" herein means "weight percentage of styrene chain recovered as insoluble part through oxidative degradation of the copolymer" based on the total styrene content in the copolymer before the oxidative degradation. The smaller the recovery is, the more excellent randomness the copolymer has.

In the copolymer obtained in Example 1, the recovery after oxidative degradation is 0%, which shows that the copolymer is a random copolymer containing no long styrene chains. While, in the copolymer obtained in Comparative Example 1, the recovery is 65%, which shows that the copolymer is high in the block property.

The styrene content and the recovery of oxidative degradation product described in Table 1 show that a random copolymer can be obtained by the use of di(tert-butoxy)barium of the second component. Example 2 shows that when a larger amount of the second component is used, the resulting copolymer contains styrene in an amount near to the charged amount of styrene in a shorter polymerization time.

Furthermore, when the microstructure of the copolymers in Examples 1 and 2 is compared with that of the copolymer in Comparative Example 1 in Table 1, it can be seen that when di(tert-butoxy)barium of the second component is used, the trans-1,4 content exceeds 60% in spite of very small variation of vinyl content.

EXAMPLE 3

A beverage bottle of 100 ml. capacity was dried completely and air in the bottle was substituted with purified nitrogen 3 times. The bottle was charged with 0.5 of di(tert-butoxy)barium dispersed in 100 parts of dried toluene, 300 parts of dried cyclohexane and 25 parts of styrene in this order by means of an injector, and the resulting mixture was cooled to −78° C. Then, 75 parts of 1,3-butadiene and 0.5 part (0.5 mmole) of n-BuLi were added to the mixture and the bottle was sealed. The bottle was left to stand in a thermostat at 50° C. provided with a rotating frame, and polymerization was effected for 90 minutes while rotating. Then, a large amount of 2% solution of phenyl-β-naphthylamine in ethanol was added to the reaction mixture to stop the polymerization reaction, and precipitated copolymer was filtered and dried at 50° C. under vacuum.

This Example 3 was different from Examples 1 and 2 in the point that the catalyst was not aged. The obtained result is shown in the following Table 2.

TABLE 2

| | |
|---|---|
| Yield (percent) | 52.3 |
| Intrinsic viscosity [η] | 0.40 |
| Styrene content (percent) | 17.9 |
| Trans-1,4 (percent) | 63.8 |
| Vinyl (percent) | 11.0 |
| Cis-1,4 (percent) | 25.2 |
| Recovery of oxidative degradation product (percent) | 0 |

Table 2 shows that when the amount of the second component used is about 0.5, the vinyl content does not substantially vary, but the content of trans-1,4-structure is remarkably increased, and the randomness of the copolymer is highly improved in view of the styrene content as compared with Comparative Example 1.

EXAMPLES 4–7

A beverage bottle of 100 ml. capacity was dried completely and air in the bottle was substituted with purified nitrogen 3 times. The bottle was charged with 400 parts of a dried hydrocarbon solvent (in Examples 4 and 5: cyclohexane, and in Examples 6 and 7: toluene), 0.2 of di(tert-butoxy)barium and 0.5 part (0.5 mmole) of n-BuLi in this order, and then sealed. The aging was effected at 50° C. for 90 minutes. The reaction system was brown and substantially homogeneous. Then 25 parts of styrene were charged into the bottle by means of an injector, and the resulting mixture was cooled to −78° C., after which 75 parts of 1,3-butadiene were fed thereto and the bottle was again sealed. The bottle was left to stand for 30 minutes in a thermostat kept at a predetermined temperature to effect polymerization.

The polymerization condition and the obtained result are shown in the following Table 3.

EXAMPLE 12

A beverage bottle of 100 ml. capacity was dried completely and air in the bottle was substituted with purified nitrogen 3 times. The bottle was charged with 100 parts of dried toluene, 0.05 of barium benzophenoneketyl and 0.5 part of n-BuLi in this order, and then sealed. The butadiene and 25 parts of styrene, and then left to stand

TABLE 3

| Example No. | Solvent | Polymerization temperature (° C.) | Yield (percent) | Intrinsic viscosity [η] | Styrene content (percent) | Microstructure of butadiene unit (percent) | | |
|---|---|---|---|---|---|---|---|---|
| | | | | | | Trans-1,4 | Vinyl | Cis-1,4 |
| 4 | Cyclohexane | 65 | 33.6 | 0.51 | 14.3 | 58.3 | 9.6 | 32.1 |
| 5 | do | 80 | 78.9 | 0.61 | 17.9 | 59.2 | 10.7 | 30.1 |
| 6 | Toluene | 65 | 54.0 | 0.56 | 18.0 | 65.9 | 10.1 | 24.0 |
| 7 | do | 80 | 79.0 | 0.62 | 23.5 | 67.5 | 10.3 | 22.2 |

EXAMPLES 8 AND 9

A beverage bottle of 100 ml. capacity was dried completely and air in the bottle was substituted with purified nitrogen 3 times. The bottle was charged with 400 parts of toluene, a predetermined amount of di(isopropoxy) barium as the second component and 0.5 part (0.5 mmole) of n-BuLi in this order, and left to stand at room temperature for several minutes to effect aging of the reaction system. Then, the reaction system was cooled to −78° C., after which 75 parts of 1,3-butadiene and 25 parts of styrene were charged in this order into the bottle, and the bottle was sealed. The bottle was left to stand for 60 minutes in a thermostat at 50° C. to effect polymerization. The obtained result is shown in the following Table 4.

TABLE 4

| Example Number | Amount of the second component used | Yield (percent) | Styrene content (percent) | Microstructure of butadiene unit (percent) | | |
|---|---|---|---|---|---|---|
| | | | | Trans-1,4 | Vinyl | Cis-1,4 |
| 8 | 0.2 | 48 | 16.5 | 64.2 | 9.7 | 26.1 |
| 9 | 0.5 | 46 | 17.6 | 63.1 | 10.4 | 26.5 |

EXAMPLE 10

In the same manner as described in Examples 8 and 9, 75 parts of butadiene and 25 parts of styrene were copolymerized. As the second component, 0.2 of di(cyclohexyloxy)barium was used. Polymerization was effected at 50° C. for 2 hours to obtain a copolymer in a yield of 7.3%. In this copolymer, the styrene content was 29.6% and the microstructure of butadiene unit had 54.2% of trans-1,4, 33.1% of cis-1,4 and 12.6% of vinyl. Furthermore, it is remarkable that this copolymer contains a large amount of styrene.

EXAMPLE 11

In the same manner as described in Examples 8 and 9, 100 parts of butadiene alone were polymerized. As the second component, 0.2 of di(phenoxy)barium was used. Polymerization was effected at 50° C. for 10 hours to obtain about 1 g. of homopolymer. The microstructure of this homopolymer had 65% of trans-1,4, 24% of cis-1,4, 11% of vinyl.

aging was effected at 50° C. for 30 minutes. Then, 300 parts of cyclohexane were charged into the bottle by means of an injector and the resulting mixture was cooled to −78° C. The bottle was charged with 75 parts of 1,3- in a thermostat kept at 50° C. for 65 minutes to effect polymerization, whereby a copolymer was obtained in a yield of 25%. In this copolymer, the styrene content was 10%, and the microstructure of butadiene unit had 60% of trans-1,4, 30% of cis-1,4, and 10% of vinyl.

EXAMPLE 13

Into a dried beverage bottle of 250 ml. capacity were charged 400 parts of dried toluene, 0.5 of barium stearate and 25 parts of styrene, and the resulting mixture was cooled to −78° C. Then, 75 parts of 1,3-butadiene and finally 0.2 part (0.6 mmole) of n-BuLi were added to the mixture, and the bottle was sealed. The bottle was left to stand in a thermostat kept at 80° C. for 20 hours to effect polymerization.

The obtained result is shown in the following Table 5.

TABLE 5

| | |
|---|---|
| Yield (percent) | 94.6 |
| Styrene content (percent) | 22.7 |
| Trans-1,4 (percent) | 70.5 |
| Vinyl (percent) | 7.8 |
| Cis-1,4 (percent) | 21.7 |
| Recovery of oxidative degradation product (percent) | 0 |

EXAMPLES 14 AND 15

A stainless steel autoclave of 3 l. capacity was dried completely and air in the autoclave was substituted with purified nirtogen 3 times to form completely inert atmosphere. Into the autoclave were charged 400 parts of an aromatic hydrocarbon solvent dried through molecular sieve, 25 parts of styrene dried through silica gel and a predetermined amount of di(tert-butoxy)barium as the second component, and the resulting mixture was cooled to −10° C. Into the mixture were added 75 parts of 1,3-butadiene and then 0.06 part (2.4 mmoles) of n-BuLi, and the resulting polymerization system was kept at 80° C. while stirring to effect polymerization. After about 1 hour, the polymerization reaction was stopped by adding a solution of 2,6-di-tert-butyl-p-cresol in acetone. The solvent was removed by the conventional steam stripping method, and the residue was dried at 50° C. under vacuum.

The polymerization condition and the obtained result are shown in the following Table 6.

TABLE 6

| Example No. | Polymerization solvent | Amount of the second component used | Polymerization time (minutes) | Yield (percent) | Intrinsic viscosity [$\eta$] | Styrene content (percent) | Microstructure of butadiene unit (percent) | | |
|---|---|---|---|---|---|---|---|---|---|
| | | | | | | | Trans-1,4 | Vinyl | Cis-1,4 |
| 14 | Toluene | 0.2 | 60 | 35 | 1.64 | 19.2 | 59.7 | 9.6 | 30.7 |
| 15 | Benzene | 0.5 | 50 | 63 | 2.00 | 21.7 | 64.8 | 8.4 | 26.8 |

EXAMPLE 16

In this example, the butadiene-styrene copolymer of the present invention was compared with a commercially available SBR obtained by a solution polymerization.

Structural properties of these copolymers are shown in the following Table 7.

In Table 7, elastomer A is a commercially available random type SBR (vinyl content: about 30%) having a medium vinyl content and obtained by a solution polymerization and elastomers B and C are the copolymers obtained in Examples 14 and 15.

TABLE 7

| Structural property | Elastomer | | |
|---|---|---|---|
| | A | B | C |
| Styrene content (percent) | 25.8 | 19.2 | 21.7 |
| Trans-1,4 (percent) | 43.5 | 59.7 | 64.8 |
| Vinyl (percent) | 32.9 | 9.6 | 8.4 |
| Cis-1,4 (percent) | 23.6 | 30.7 | 26.8 |
| Recovery of oxidative degradation product (percent)* | 0 | 0 | 0 |
| [$\eta$] | 1.92 | 1.64 | 2.00 |
| ML-4 (100° C.) | 58 | 35 | 61 |
| Glass transition temperature (Tg) (° C.) | −56 | −77 | −75 |

These elastomers A, B and C were compounded in the following recipe, respectively.

| | Part |
|---|---|
| Copolymer | 100 |
| Carbon black (ISAF) | 60 |
| Aroma oil | 20 |
| Zinc oxide | 5 |
| Stearic acid | 2 |
| Vulcanizing accelerator [1] | 1.2 |
| Sulfur | 1.75 |

[1] N-oxyethylene-2-benzothiazolsulfenamide.

Vulcanized rubbery compositions A', B' and C' of these elastomers had physical properties as shon in the following Table 8.

TABLE 8

| | A' | B' | C' |
|---|---|---|---|
| Elongation (percent) | 500 | 585 | 580 |
| Tensile strength (kg./cm.²) | 211 | 215 | 236 |
| 300% modulus (kg./cm.²) | 108 | 81 | 92 |
| Resilience (percent) | 47 | 47 | 47 |
| Hardness | 66 | 64 | 64 |
| Roll processability | ([1]) | Good | Good |

[1] Somewhat poor.

Table 8 shows that the vulcanized rubbery compositions B' and C' containing the copolymers of the present invention are superior in the elongation, tensile strength and roll processability to the vulcanized rubbery composition A' containing the control commercially available SBR obtained by a solution polymerization, and are substantially the same with the composition A' in the resilience.

Furthermore, the copolymer obtained in the present invention has a glass transition temperature about 20° C. lower than the commercially available SBR, and can endure to a use at a relatively low temperature.

EXAMPLE 17

A beverage bottle of 250 ml. capacity was dried completely and air in the bottle was substituted with purified nitrogen 3 times. The bottle was charged with 400 parts dried n-hexane, 25 parts of styrene and 0.5 of di(tert-butoxy)barium as the second component in this order, and the resulting mixture was cooled to −78° C. Then, 75 parts of 1,3-butadiene and finally 0.1 part (0.4 mmole) of n-BuLi were added to the mixture and the bottle was sealed. The bottle was placed in a thermostat at 80° C. provided with a rotating frame for 12 hours to effect polymerization.

The obtained result is shown in the following Table 9.

TABLE 9

| | |
|---|---|
| Yield (percent) | 97.0 |
| Intrinsic viscosity [$\eta$] | 2.35 |
| Styrene content (percent) | 24.7 |
| Trans-1,4 (percent) | 55.2 |
| Vinyl (percent) | 13.0 |
| Cis-1,4 (percent) | 31.7 |
| Recovery of oxidative degradation product (percent) | 0 |

A beverage bottle of 250 ml. capacity was dried in a usual way and charged with 400 parts of dried toluene and 0.5 of di(tert-butoxy)barium, and the resulting mixture was cooled to −78° C. Then, 100 parts of 1,3-butadiene (Example 18), an equimolar mixture (Example 19) of 1,3-butadiene and isoprene or isoprene (Example 20) and finally 0.3 part (0.9 mmole) of n-BuLi were added to the mixture. After the bottle was sealed, the polymerization was effected at 80° C. for a predetermined period of time. The polymerization condition and the obtained result are shown in the following Table 10.

TABLE 10

| Example number | Polymerization time (minutes) | Yield percent | Microstructure of butadiene unit (percent) | | |
|---|---|---|---|---|---|
| | | | Trans-1,4 | Vinyl | Cis-1,4 |
| 18 | 60 | 88.3 | 62.3 | 9.5 | 28.2 |
| 19 | 300 | 89.6 | 64.3 | 11.8 | 23.9 |
| 20 | 60 | 35.0 | | | |

EXAMPLES 21 AND 22

A beverage bottle of 250 ml. capacity was dried in a usual way and charged with 400 parts of dried toluene, a predetermined amount of di(tert-butoxy)barium and 25 parts of styrene, and the resulting mixture was cooled to −78° C. Then, 75 parts of 1,3-butadiene and finally 0.3 part of an organolithium compound as shown in the following Table 11 were added to the mixture and the bottle was sealed. The bottle was placed in a thermostat at 70° C. provided with a rotating frame for 60 minutes to effect polymerization. The polymerization condition and the obtained result are shown in the following Table 11.

TABLE 11

| Example number | Organolithium compound | Amount of the second component used | Yield (percent) | Styrene content (percent) | Microstructure of butadiene unit (percent) | | | Recovery of oxidative degradation product (percent) |
|---|---|---|---|---|---|---|---|---|
| | | | | | Trans-1,4 | Vinyl | Cis-1,4 | |
| 21 | Phenyllithium | 0.6 | 80.5 | 19.5 | 58.5 | 12.3 | 28.9 | 0 |
| 22 | Dilithiostilbene | 0.6 | 81.3 | 24.9 | 56.8 | 12.1 | 31.1 | 0 |
| Comparative Example 2 | do | 0 | 94.5 | 24.6 | 51.8 | 12.8 | 35.4 | 52.4 |

EXAMPLE 23

Into a dried bottle of 250 ml. capacity were charged 400 parts of dried toluene, 0.5 part of di(tert-butoxy) barium and 25 parts of styrene, and the resulting mixture was cooled to —78° C. Then, 75 parts of 1,3-butadiene and finally 0.3 part of n-BuLi were added to the mixture. After the bottle was sealed, it was left to stand in a thermostat at 100° C. for 30 minutes to effect polymerization.

The obtained result is shown in the following Table 12.

TABLE 12

| | Percent |
|---|---|
| Yield | 97.8 |
| Styrene content | 23.5 |
| Trans-1,4 | 58.9 |
| Vinyl | 9.7 |
| Cis-1,4 | 31.4 |
| Recovery of oxidative degradation product | 0 |

What is claimed is:

1. A method for preparing conjugated diene polymers having 50 to 70% trans-1,4-structure which comprises contacting a monomeric material selected from (1) at least one conjugated diene and (2) a mixture of a conjugated diene and a vinyl-substituted aromatic hydrocarbon, at a temperature in the range of —30 to 150° C., in the presence of a hydrocarbon diluent, with a catalyst consisting of (I) an organolithium compound having the formula $R^1(Li)x$, wherein $R^1$ is selected from the group consisting of aliphatic, cycloaliphatic and aromatic hydrocarbon radicals having 1 to 40 carbon atoms and $x$ is an integer from 1 to 4 and (II) barium compound having one of the following formulae:

(1) $Ba{-}(L{-}R^2)_2$ (2) $Ba{-}(L{-}\underset{\underset{L}{\|}}{C}{-}R^3)_2$ (3) $Ba{-}(L{-}\underset{\underset{L}{\|}}{C}{-}L{-}R^3)_2$ (4) $Ba{-}(N{<}^{R^2}_{R^2})_2$ (5) diphenylbarium
(6) barium benzophenoneketyl
(7) biscyclopentadienylbarium
(8) 1,2-acenaphthylenebarium (9) 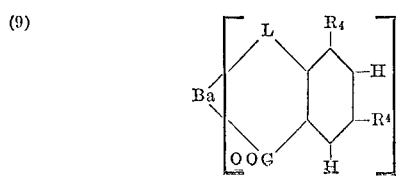

wherein $R^2$ is selected from the group consisting of aliphatic, cycloaliphatic and aromatic hydrocarbon radicals having 1 to 20 carbon atoms, $R^3$ is selected from the group consisting of aliphatic, cycloaliphatic and aromatic hydrocarbon radicals having 4 to 20 carbon atoms, $R^4$ is selected from the group consisting of hydrogen atom and aliphatic hydrocarbon radical having 1 to 10 carbon atoms, L is oxygen or sulfur atom; the amount of said organolithium compound being in the range of 0.01 to 100 mmoles per mole of said monomeric material, the amount of said barium compound being in the range of 0.01 to 100 mmoles per mole of said monomeric material and the molar ratio of said barium compound to said organolithium compound being in the range of 0.05 to 10.0 and a catalyst (B) prepared by reacting (I).

2. A method according to claim 1, wherein said monomeric material is 1,3-butadiene.

3. A method according to claim 1, wherein said monomeric material is a mixture of 1,3-butadiene and isoprene.

4. A method according to claim 1, wherein said monomeric material is a mixture of 1,3-butadiene and styrene.

5. A method according to claim 1, wherein said monomeric material is a mixture of isoprene and styrene.

6. A method according to claim 1, wherein said organolithium compound is n-butyllithium.

7. A method according to claim 1, wherein said organolithium compound is phenyllithium.

8. A method according to claim 1, wherein said organolithium compound is dilithiostilbene.

9. A method according to claim 1, wherein said barium compound is di(tert-butoxy)barium.

10. A method according to claim 1, wherein said barium compound is di(isopropoxy)barium.

11. A method according to claim 1, wherein said barium compound is di(cyclohexyloxy)barium.

12. A method according to claim 1, wherein said barium compound is di(phenoxy)barium.

13. A method according to claim 1, wherein said barium compound is barium benzophenoneketyl.

14. A method according to claim 1, wherein said barium compound is barium stearate.

15. A method according to claim 1, wherein said catalyst is a catalyst system consisting of n-butyllithium and di(tert-butoxy)barium.

16. A method according to claim 1, wherein said catalyst (A) is a catalyst system consisting of n-butyllithium and di(isopropoxy)barium.

17. A method according to claim 1, wherein said catalyst (A) is a catalyst system consisting of n-butyllithium and di(cyclohexyloxy)barium.

18. A method according to claim 1, wherein said catalyst (A) is a catalyst system consisting of n-butyllithium and di(phenoxy)barium.

19. A method according to claim 1, wherein said catalyst (A) is a catalyst system consisting of n-butyllithium and barium benzophenoneketyl.

20. A method according to claim 1, wherein said catalyst (A) is a catalyst system consisting of n-butyllithium and barium stearate.

21. A method according to claim 1, wherein said catalyst (A) is a catalyst system consisting of phenyllithium and barium stearate.

22. A method according to claim 1, wherein said catalyst (A) is a catalyst system consisting of dilithiostilbene and di(tert-butoxy)barium.

23. A method according to claim 1, wherein the resulting copolymer is a copolymer of 1,3-butadiene and styrene.

24. A method according to claim 1, wherein in said catalyst the amount of said organolithium compound being in the range of 0.03 to 10 mmoles per mole of said monomeric material and the amount of said barium compound being in the range of 0.05 to 50 mmoles per mole of said monomeric material and the molar ratio of said barium compound to said organolithium compound being in the range of 0.1 to 4.0.

References Cited
UNITED STATES PATENTS

| | | | |
|---|---|---|---|
| 2,908,672 | 10/1959 | Jackson | 260—94.2 |
| 2,947,737 | 8/1960 | Stearns | 260—94.2 |
| 3,049,528 | 8/1962 | Diem | 260—94.2 |
| 3,294,768 | 12/1966 | Wofford | 260—83.7 |
| 3,317,918 | 5/1967 | Foster | 260—83.7 |
| 3,464,961 | 9/1969 | Foster | 260—83.7 |

JOSEPH L. SCHOFER, Primary Examiner

R. A. GAITHER, Assistant Examiner

U.S. Cl. X.R.

260—83.7, 84.1, 94.2, 94.6